United States Patent
van der Zalm et al.

(10) Patent No.: US 10,399,251 B2
(45) Date of Patent: Sep. 3, 2019

(54) NOZZLE FOR A THREE DIMENSIONAL PRINTING APPARATUS

(71) Applicant: Ultimaker B.V., Geldermalsen (NL)

(72) Inventors: Erik van der Zalm, Eindhoven (NL); Johan Andreas Versteegh, Geldermalsen (NL); Robert Huitema, Maurik (NL); Matthijs Neut, Enschede (NL); Martijn Elserman, Geldermalsen (NL)

(73) Assignee: Ultimaker B.V., Geldermalsen (NL)

( * ) Notice: Subject to any disclaimer, the term of this patent is extended or adjusted under 35 U.S.C. 154(b) by 5 days.

(21) Appl. No.: 15/618,153

(22) Filed: Jun. 9, 2017

(65) Prior Publication Data
US 2017/0361501 A1  Dec. 21, 2017

(30) Foreign Application Priority Data
Jun. 21, 2016 (NL) .................... 2017016

(51) Int. Cl.
| B29C 31/04 | (2006.01) |
| B33Y 30/00 | (2015.01) |
| B29C 64/106 | (2017.01) |
| B29C 64/209 | (2017.01) |
| B29C 64/112 | (2017.01) |
| B29C 64/20 | (2017.01) |

(52) U.S. Cl.
CPC .......... *B29C 31/048* (2013.01); *B29C 64/106* (2017.08); *B29C 64/112* (2017.08); *B29C 64/20* (2017.08); *B29C 64/209* (2017.08); *B33Y 30/00* (2014.12)

(58) Field of Classification Search
CPC ....... B33Y 30/00; B33Y 70/00; B29C 64/209; B29C 64/112; B29C 64/20; B29C 64/106; B29C 31/04; B29C 31/041; B29C 31/042; B29C 31/044; B29C 31/047; B29C 31/048; B05B 7/16–228; B05B 1/24; B05B 5/001; B05B 3/001; B05B 9/002; B05B 11/0002
USPC ............................ 239/75, 13, 81, 128–139
See application file for complete search history.

(56) References Cited

U.S. PATENT DOCUMENTS

2012/0070523 A1 * 3/2012 Swanson ............. B29C 47/0002
425/96

FOREIGN PATENT DOCUMENTS

CN   103395973 A   11/2013

* cited by examiner

*Primary Examiner* — Viet Le
*Assistant Examiner* — Juan C Barrera
(74) *Attorney, Agent, or Firm* — N.V. Nederlandsch Octrooibureau; Catherine A. Shultz; Tamara C. Stegmann

(57) ABSTRACT

A nozzle for a three-dimensional printing apparatus, comprising a main nozzle body (2) having an inlet end (4), an outlet end (6) and a central conduit (8) arranged there between, wherein the main nozzle body (2) is made of an electrically non-conductive body material. The main nozzle body (2) is provided with an electrically conductive first layer (10) and/or an electrically non-conductive second layer (12) arranged around the main nozzle body (2).

11 Claims, 1 Drawing Sheet

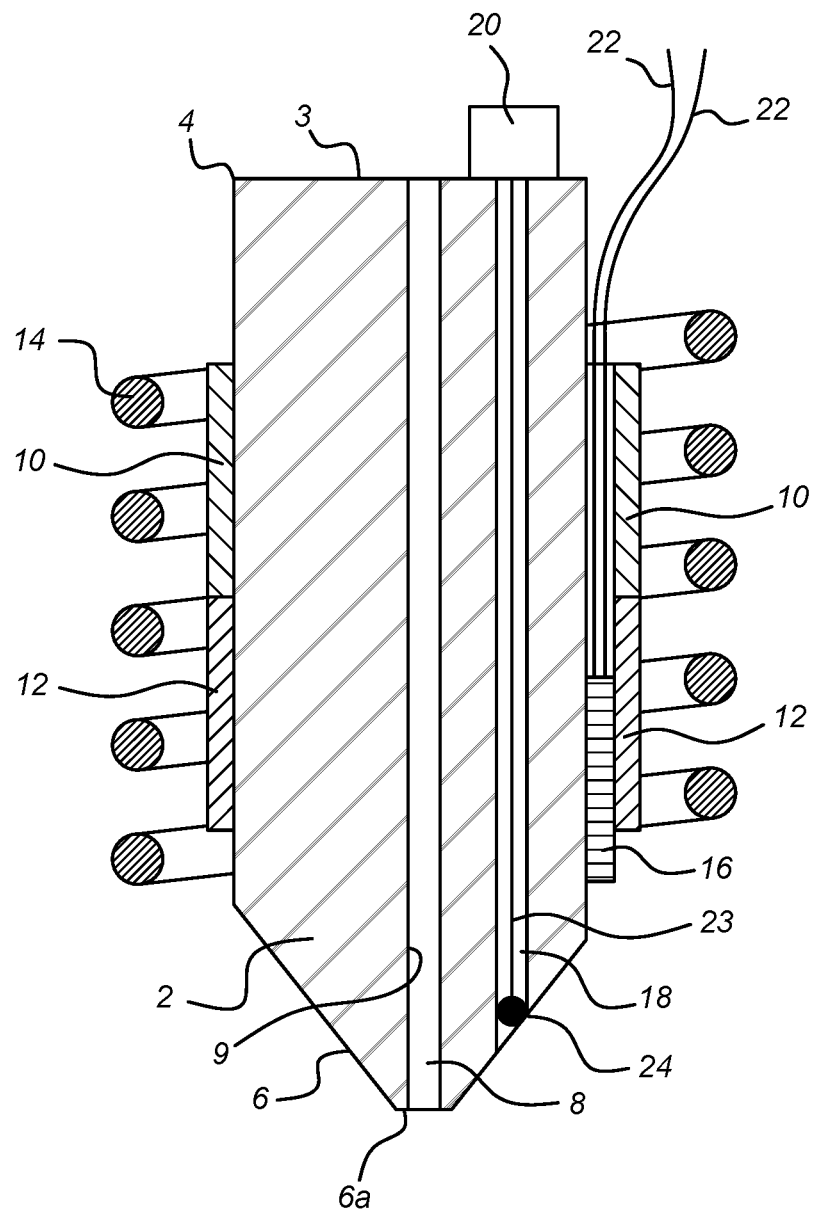

NOZZLE FOR A THREE DIMENSIONAL PRINTING APPARATUS

FIELD OF THE INVENTION

The present invention relates to a nozzle for a three dimensional printing apparatus.

PRIOR ART

US patent application US 2014/0044822 A1 discloses a three dimensional printer with a removable and replaceable extrusion nozzle. The printer may comprise an extrusion head made of metal and having an output nozzle removably connected thereto through mutually cooperating nozzle couplings arranged on the extrusion head and the output nozzle. A heating element may be thermally coupled to one or more walls of a chamber of the extrusion head. In some implementations, the removable and replaceable output nozzle may be constructed of a material including a plastic, a ceramic, a metal (including shape memory alloy), a polymer, engineered glass (including PYREX).

Chinese patent application CN 103395973 A discloses a nozzle for extruding glass. The nozzle comprises a tubular body made of corundum and which is provided with a central passageway for feeding the glass. In operation the glass passes a preheating section, an expanding softening section and a melting section of the nozzle, wherein heat is provided by a heating wire layer wrapped around the tubular body.

SUMMARY OF THE INVENTION

The present invention seeks to provide a nozzle or extrusion head for a three dimensional printing apparatus, wherein the nozzle or extrusion head allows for improved interfacing between the nozzle and one or more sensors and/or actuators for monitoring and/or controlling nozzle temperatures, nozzle dimensions and/or nozzle positions as well as extrusion behaviour of build material as it passes through the nozzle during a three dimensional printing process.

According to the present invention a nozzle according to the type defined in the preamble is provided comprising a main nozzle body having an inlet end, an outlet end and a central conduit arranged there between, wherein the main nozzle body is made of an electrically non-conductive body material, and wherein the main nozzle body is provided with an electrically conductive first layer and/or an electrically non-conductive second layer arranged around the main nozzle body.

According to the present invention the electrically non-conductive main nozzle body provides an electrically resistant nozzle body allowing improved measurement and control of printing parameters during a three dimensional printing process. More specifically, the electrically non-conductive main nozzle body allows for improved thermal management of build material to be dispensed by the nozzle as well as improved interfacing between one or more sensors and/or actuators and the nozzle for measurement and control of printing parameters, e.g. nozzle temperature, nozzle position and the like.

Further, the electrically conductive first layer and/or the electrically non-conductive second layer arranged around the main nozzle body each provide a functional layer to facilitate and provide measurement and/or control of any printing parameter deemed necessary for optimal nozzle behavior during the three-dimensional printing process.

The electrically conductive first layer may facilitate measurement and/or control of one or more printing parameters wherein electrical conductivity of the first layer is a main characteristic used for that purpose.

The electrically non-conductive second layer may facilitate measurement and/or control of one or more printing parameters wherein electrical non-conductivity or electrical resistance of the second layer is a main characteristic used for that purpose.

Therefore, the nozzle of the present invention can be functionally adapted by choosing a desired electrically non-conductive body material for the main nozzle body in conjunction with materials for one or more functional layers, i.e. for the electrically conductive first layer and/or the electrically non-conductive second layer. The combination of the main nozzle body and the one or more functional layers facilitates measurement and/or control of various printing parameters such thermal and/or positional parameters of the nozzle to improve the overall quality of the final printed product.

The electrically non-conductive body material, the electrically conductive first layer and/or the electrically non-conductive second layer may be chosen so as to adapt parts of the nozzle with regard to emissivity, magnetic permeability, optical and/or RF transparency and/or reflectivity, so that the nozzle is optimized for a required three dimensional printing process.

In an exemplary embodiment, the electrically non-conductive body material is at least in part optically transparent and/or at least in part RF transparent. This embodiment allows the main nozzle body itself to be used as a medium for conveying information for measurement and/or control purposes. For example, a main nozzle body which is at least in part optically transparent is advantageous for optical measurements through the main nozzle body itself but also for optically measuring build material being printed or extruded by the nozzle. Furthermore, a main nozzle body which is at least in part RF transparent may facility deployment of electro-magnetic waves, e.g. radio frequencies, for various measurement purposes.

In an embodiment, the electrically non-conductive body material comprises a first glass, a first ceramic or a first mineral material, or any combination thereof. This embodiment provides suitable materials that provide a high level of electrical non-conductivity or resistance. The first glass material, for example, allows optical signals to pass at least in part through the main nozzle body yet provide good electrical insulation. The first ceramic material may be chosen so as to allow for high or low thermal conductivity yet with high electrical resistance. The first mineral material, e.g. natural stone, gemstone etc. may also be chosen for obtaining a desired thermal behaviour of the main nozzle body in conjunction with electrical non-conductivity.

In an embodiment the electrically conductive first layer comprises a metal or graphite material, or a combination thereof. This embodiment allows for e.g. induction heating the main nozzle body.

In an embodiment the electrically non-conductive second layer comprises a second glass, a second ceramic or a second mineral material, or any combination thereof. The second layer may be adapted to provide particular thermal, emissivity, and/or RF transparency properties to the second layer.

SHORT DESCRIPTION OF DRAWINGS

The present invention will be discussed in more detail hereinafter based on a number of exemplary embodiments with reference to the drawings, in which FIG. 1 shows a cross sectional view of an embodiment of the nozzle according to the present invention.

DETAILED DESCRIPTION OF EXEMPLARY EMBODIMENTS

FIG. 1 shows a cross sectional view of an embodiment of the nozzle according to the present invention. In the embodiment shown the nozzle 1 comprises a main nozzle body 2 having an inlet end 4, an outlet end 6 and a central conduit 8 arranged there between. The central conduit 8 connects the inlet end 4 and the outlet end 6 for dispensing a build material during a printing process. The main nozzle body 2 is made of an electrically non-conductive body material and as such the main nozzle body 2 exhibits a high electrical resistance.

The main nozzle body 2 is provided with an electrically conductive first layer 10 and/or an electrically non-conductive second layer 12 arranged around the main nozzle body 2.

The electrically non-conductive main nozzle body 2 allows improved measurement and/or control of printing parameters during a three dimensional printing process, such as thermal and/or positioning parameters of the nozzle. More specifically, the electrically non-conductive main nozzle body 2 allows for improved thermal management of the nozzle 1 as well as improved interfacing between one or more sensors and/or actuators and the nozzle 1.

Further, the electrically conductive first layer 10 and/or the electrically non-conductive second layer 12 are arranged around the main nozzle body 2 each providing a functional layer to facilitate and provide improved measurement and/or control of any printing parameter deemed necessary.

In an advantageous embodiment, the first and/or the second layer 10, 12 may be deposited as thin layers (coatings) onto an outer surface 3 of the main nozzle body 2. In a further embodiment the first and/or the second layer 10, 12 may be a sleeve or collar element arranged or clamped around the main nozzle body 2, thus allowing convenient assembly of the nozzle 1.

In an advantageous embodiment the electrically non-conductive body material is at least in part optically transparent and/or at least in part RF transparent.

This embodiment allows the main nozzle body 2 itself to be used as a medium for conveying information, e.g. for measurement and control purposes. A main nozzle body 2 which is at least in part optically transparent is advantageous for optical measurements of the main nozzle body 2 itself but also for optically measuring build material being dispensed by the nozzle 1. Furthermore, a main nozzle body 2 which is at least in part RF transparent may facility deployment of electro-magnetic waves, e.g. radio frequencies, for measurement and control purposes of the nozzle 1.

In an embodiment the electrically non-conductive body material comprises a first glass, a first ceramic, a first mineral material, or any combination thereof. This embodiment provides materials exhibiting a high level of electrical non-conductivity or electrical resistance. The first glass material, for example, allows optical signals to pass at least in part through the main nozzle body 2 yet provide good electrical insulation. The optical signals may be deployed for measuring nozzle parameters such as nozzle position. The optical signals may also be used to measure a state of the build material being dispensed by the nozzle 1.

The first glass material also allows for efficient moulding or casting techniques for manufacturing the main nozzle body 2, wherein the main nozzle body 2 is readily provided with smooth surfaces, such as a smooth inner surface 9 of the central conduit 8 through which build material is conveyed during a printing process. The first glass material also provides smooth corners between different surfaces of the main nozzle body 2, such as smooth corners at e.g. a nozzle tip 6a of the outlet end 6 of the main nozzle body 2. Smooth surfaces and smooth corners between different surfaces of the main nozzle body 2 improve and facilitate flow of build material through the nozzle 1, e.g. through the central conduit 8, and further reduce adherence of the build material to the main nozzle body 2, the outlet end 6, or nozzle tip 6a thereof.

The first ceramic material may be chosen so as to allow for high or low thermal conductivity, depending on its composition, yet provide for e.g. good RF transparency. In various embodiments the first ceramic material may comprise amorphous, polymorphous, monocrystalline ceramics and ceramic alloys. Further embodiments allow the first ceramic material to comprise zirconium, such as alumina-reinforced zirconia.

The first mineral material may be envisaged as also providing high levels of electrical non-conductivity but varying degrees of thermal conductivity depending on its composition chosen. Also, the first mineral material may provide various levels or optical transparency to the main nozzle body 2 useful for measurement and control purposes. In an embodiment the first mineral material may comprise stone or gemstone material, such as materials of sapphires, rubies and the like. Such first mineral material provide improved aesthetics as well.

In an embodiment the electrically conductive first layer 10 comprises a metal (e.g. nickel) or graphite material (e.g. pyrolytic graphite), or a combination thereof. This embodiment provides a functional layer to the main nozzle body 2 that can be used for measurement and/or control purposes of a printing process. For example, the metal or graphite material allows for induction heating of the nozzle 1, in particular the main nozzle body 2 thereof to e.g. melt the build material to be dispensed by the nozzle 1.

In an embodiment the nozzle 1 of the present invention may further comprise a coil element 14 arranged around the main nozzle body 2 for providing contactless induction engagement with the electrically conductive first layer 10. The electrically conductive first layer 10 may then be chosen to comprise a metal or graphite material.

With regard to a second functional layer arranged on the main nozzle body 2, in an embodiment the electrically non-conductive second layer 12 may comprises a second glass, a second ceramic or a second mineral material, or any combination thereof. This embodiment allows for the second glass, the second ceramic or the second mineral material to be chosen so as to provide the same or different physical characteristics compared to the first glass, the first ceramic or the first mineral material used for the main nozzle body 2. The various physical characteristics and advantages of the first glass, the first ceramic or first mineral material as exemplified above may be comparable to those of the second glass, second ceramic or second mineral material used for the electrically non-conductive second layer 12.

In view of the various embodiments described above, an advantageous and probably often used embodiment is where the main nozzle body 2 is made of an electrically non-conductive body material comprising a glass and/or a ceramic material, and wherein the main nozzle body 2 is provided with an electrically conductive first layer 10 arranged around the main nozzle body 2 comprising a metal and/or graphite material. Due to the metal and/or graphite material, the first layer 10 allows for induction heating of the main nozzle body 2. The glass and/or ceramic material of the main nozzle body 2 then allows for good thermal management, without interfering with the inductive process, for optimized heating of the build material conveyed through the central conduit 8. As mentioned earlier, the electrically conductive first layer 10 may be a coating deposited on the main nozzle body 2 but may also be a sleeve or collar attached or clamped around said nozzle body 2.

Further to the embodiment depicted in FIG. 1, in an embodiment the nozzle 1 may further comprise a first sensor actuator element 16 arranged on an outer surface 3 of the main nozzle body 2, on an inner surface 9 of the central conduit 8 or within (e.g. embedded) the electrically non-conductive body material of the main nozzle body 2. This embodiment allows for sensory and/or actuation capability at the nozzle 1. For example, in an embodiment the first sensor actuator element 16 is a light sensor and/or a light source, so that optical measurement and control is possible of a printing process directly at the nozzle 1. In case the electrically non-conductive body material comprises a first glass material and/or a transparent first mineral material, for example, the first sensor actuator element 16 may utilize optical signals traveling through the main nozzle body 2 for measurement and/or control purposes. In an alternative embodiment the first sensor actuator element 16 is a thermal sensor element in thermal sensing engagement with the main nozzle body 2.

In a further embodiment, the nozzle 1 may further comprise a pathway 18 extending at least in part through the main nozzle body 2 between the central conduit 8 and an outer surface 3 of the main nozzle body 2. The pathway 18 further provides functionality for measurement and/or control purposes. For example, in an embodiment the pathway 18 comprises a secondary (hollow) conduit for receiving e.g. an electric signal cable 23, a fiber optic cable 23 and the like, optionally having a sensor actuator member 24 attached to its end which is proximal to the outlet end 6 of the main nozzle body 2. The cable 23 may also be connected to the first sensor actuator element 16 mentioned above at its distal end with respect to the outlet end 6. Of course, in further embodiments the secondary conduit may also be left empty and be used for sending optical signals directly there through.

In an alternative embodiment, the pathway 18 may also comprise an optical pathway, allowing for optical signals to pass there through for measurement and control purposes. Note that in this embodiment the optical pathway 18 need not be a conduit or bore as such but may be "solid", optionally exhibiting a material structure different from a material structure of the main nozzle body 2. For example, in an embodiment the electrically non-conductive body material may comprise a first glass material having a first glass structure, wherein the pathway 18 then comprises a second glass material having a second material structure different from the first glass structure. This embodiment may for example utilize Bragg grating as known in the field of signal communications. It is of course possible that the first and second glass material are effectively the same but wherein the optical pathway 18 has at least locally a different material structure to facilitate a Bragg grating.

In a further embodiment the first and second glass material may also be different just to allow for improved optical signal transfer through the main nozzle body. In yet a further embodiment the electrically non-conductive body material of the main nozzle body 2 may comprise a first ceramic or a first mineral material and wherein the pathway 18 comprises a first glass material, thereby allowing optical signal communication through the main nozzle body 2 even though the electrically non-conductive body material may be insufficiently optical transparent.

As depicted in FIG. 1, an embodiment may be provided wherein the nozzle 1 comprises the electrically conductive first layer 10 and the electrically non-conductive second layer 12, wherein the electrically conductive first layer 10 and the electrically non-conductive second layer 12 are arranged next to each other in longitudinal direction of the nozzle 1. In this embodiment a plurality of functional layers are provided side by side along the main nozzle body 2, thereby allowing for measurement and/or control of nozzle parameters along the main nozzle body 2.

As an alternative, in a further embodiment the nozzle 1 comprises the electrically conductive first layer 10 and the electrically non-conductive second layer 12, wherein the electrically conductive first layer 10 and the electrically non-conductive second layer 12 overlap each other. In this way a plurality of functional layers are provided for e.g. compounded measurement and control of particular parameters (e.g. temperature) at a shared location along the main nozzle body 2. Therefore, an embodiment is conceivable wherein the first layer 10 may be arranged at least in part underneath the second layer 12 or, conversely, the second layer 12 may be arranged at least in part underneath the first layer 10.

The nozzle 1 of the present invention does not limit the use of further sensor and/or actuator elements for measurement and control of nozzle behaviour during a printing process. For example, in an embodiment the nozzle 1 may further comprise a second sensor element 20 arranged between the main nozzle body 2 and the electrically conductive first layer 10 and/or the electrically non-conductive second layer 12. This embodiment allows for direct contact measurement of the main nozzle body 2 without interfering with the electrically conductive first layer 10 and/or the electrically non-conductive second layer 12. For example, in an embodiment the second sensor element 20 may be a thermal sensor. In an embodiment the thermal sensor 20 may be a thermocouple having connectors 22, wherein the connectors 22 may be routed underneath the electrically conductive first layer 10 and/or the electrically non-conductive second layer 12.

As disclosed above, the present invention provides a nozzle 1 for a three dimensional printing apparatus wherein the nozzle 1 comprises a main nozzle body 2 made of an electrically non-conductive body material and where an electrically conductive first layer 10 and/or an electrically non-conductive second layer 12 are provided around the main nozzle body 2. The first and/or the second layer 12 are configured for providing a functional layer for measurement and/or control of nozzle behavior, e.g. thermal, dimensional, positional behavior and the like.

The electrically non-conductive body material may be chosen to comprise a first glass, a first ceramic, a first mineral material, or any combination thereof. The electrically conductive first layer 10 may then be chosen to comprise a metal or a graphite material, or a combination thereof, and the electrically non-conductive second layer 12 may be chosen to comprise a second glass, a second ceramic or a second mineral material, or any combination thereof. It is emphasized that the nozzle 1 may only comprise the electrically conductive first layer 10 or the electrically non-conductive second layer 12, but the nozzle 1 may also comprise both the first and the second layer 10, 12.

Due to the use of the mentioned materials above it becomes possible to provide a high quality nozzle 1 for a three dimensional printing apparatus through proper selection between these materials. The present invention does not put a definite limit on a particular combination of materials used and any combination of materials is possible whenever needed. Naturally, the combination of materials will depend on what the nozzle 1 is supposed to achieve and how it should perform in practice.

For example, in an embodiment the electrically non-conductive body material may comprise a first ceramic material and the second electrically non-conductive layer 12 may comprise a second ceramic material as well. The first and second ceramic material may be adapted and configured to complement each other with regard to e.g. thermal management and behaviour of the nozzle 1. It is conceivable that the second ceramic material may provide different emissivity, RF transparency, thermal capacity etc. from the first ceramic material. In another embodiment it is likewise conceivable that the electrically non-conductive body material comprises a first glass material and the second electrically non-conductive layer 12 comprising a second glass material. This embodiment would allow for e.g. measurement of nozzle behaviour through optical signals, through different refraction indexes and so forth.

From the above it is clear that the number of material configurations for the electrically non-conductive body material, electrically conductive first layer 10 and/or the electrically non-conductive second layer 12 are virtually endless, allowing for targeted functionalities to facilitate measurement and control of the behaviour of the nozzle 1 during a printing process, e.g. thermal, dimensional, and positional behaviour.

Each of the materials and material configurations used may be specifically chosen to achieve a desired level of emissivity, thermal capacity, magnetic permeability, optical and/or RF transparency and/or aesthetics surface properties of the nozzle 1.

Even though the nozzle 1 of the present invention comprises an electrically conductive first layer 10 and/or an electrically non-conductive second layer 12 arranged around the main nozzle body 2. It is certainly possible that the nozzle 1 may comprise a plurality of electrically conductive first layers 10 and/or a plurality of electrically non-conductive second layers 12 arranged around the main nozzle body 2. The plurality of first and/or second layers 10, 12 may be arranged side by side and/or at least partially overlapping to achieve a particular interaction there between and/or between said layers and the main nozzle body 2.

In a particular example, an embodiment may be provided wherein the nozzle 1 may comprise a main nozzle body 2 made of a first glass, a first ceramic or a first mineral material, or a combination thereof. Then a plurality of electrically conductive first layers 10 may be provided around the main nozzle body 2, each having different characteristics, e.g. induction characteristics. The plurality of electrically conductive first layers 10 may then be provided as coatings or sleeves/collars positioned side by side along a longitudinal direction of the main nozzle body 2. Each of the electrically conductive first layers 10 may comprise a metal and/or a graphite material. By arranging a coil element 14 around the main nozzle body 2, each electrically conductive first layer 10 can be inductively engaged by the coil element 14 for induction heating of each first layer 10, thereby heating the main nozzle body 2 and ultimately heating the build material to be dispensed by the nozzle 1.

Since a plurality of electrically conductive first layers 10 are provided along the main nozzle body 2, a thermal profile can be achieved during a printing process, such as inductively preheating the build material near the inlet end 4 and inductively heating the build material to operating temperature near the outlet end 6.

In view of the above disclosure, the present invention can now be summarized by the following embodiments:

Embodiment 1

Nozzle for a three-dimensional printing apparatus, comprising a main nozzle body (2) having an inlet end (4), an outlet end (6) and a central conduit (8) arranged there between, wherein the main nozzle body (2) is made of an electrically non-conductive body material, and wherein the main nozzle body (2) is provided with an electrically conductive first layer (10) and/or an electrically non-conductive second layer (12) arranged around the main nozzle body (2).

Embodiment 2

Nozzle according to embodiment 1, wherein the electrically non-conductive body material is at least in part optically transparent and/or at least in part RF transparent.

Embodiment 3

Nozzle according to embodiment 1 or 2, wherein the electrically non-conductive body material comprises a first glass material, a first ceramic material, a first mineral material, or any combination thereof.

Embodiment 4

Nozzle according to any one of embodiments 1-3, wherein the electrically conductive first layer (10) comprises a metal or graphite material, or a combination thereof.

Embodiment 5

Nozzle according to any one of embodiments 1-4, wherein the electrically non-conductive second layer (12) comprises a second glass, a second ceramic, a second mineral material, or any combination thereof.

Embodiment 6

Nozzle according to any one of embodiments 1-5, wherein a first sensor actuator element (16) is arranged on an outer surface (3) of the main nozzle body (2), on an inner surface (9) of the central conduit (8), or within the electrically non-conductive body material of the main nozzle body (2).

Embodiment 7

Nozzle according to embodiment 6, wherein the first sensor actuator element (16) is a light sensor and/or a light source and/or a thermal sensor.

Embodiment 8

Nozzle according to any one of embodiments 1-7, wherein the nozzle (1) comprises the electrically conductive first layer (10) and the electrically non-conductive second layer (12), wherein the electrically conductive first layer (10) and the electrically non-conductive second layer (12) are arranged next to each other in a longitudinal direction of the nozzle (1).

Embodiment 9

Nozzle according to any one of embodiments 1-8, wherein the nozzle (1) comprises the electrically conductive first layer (10) and the electrically non-conductive second layer (12), wherein the electrically conductive first layer (10) and the electrically non-conductive second layer (12) overlap each other.

Embodiment 10

Nozzle according to any one of embodiments 1-9, wherein the nozzle (1) further comprises a second sensor actuator element (20) arranged between the main nozzle body (2) and the electrically conductive first layer (10) and/or the electrically non-conductive second layer (12).

Embodiment 11

Nozzle according to embodiment 10, wherein the second sensor actuator element (20) is a thermal sensor.

Embodiment 12

Nozzle according to any one of embodiments 1-11, wherein the nozzle (1) further comprises a pathway (18) extending through the main nozzle body (2) between the central conduit (8) and an outer surface (3) of the main nozzle body (2).

Embodiment 13

Nozzle according to embodiment 12, wherein the pathway (18) is a secondary conduit or an optical pathway.

Embodiment 14

Nozzle according to any one of embodiments 1-13, wherein the nozzle (1) further comprises a coil element (14) in induction engagement with the electrically conductive first layer (10) during operation of the nozzle (1).

The present invention embodiments have been described above with reference to a number of exemplary embodiments as shown in and described with reference to the drawings. Modifications and alternative implementations of some parts or elements are possible, and are included in the scope of protection as defined in the appended claims.

The invention claimed is:

1. A nozzle for a three-dimensional printing apparatus, comprising a main nozzle body having an inlet end, an outlet end and a central conduit arranged there between, wherein the main nozzle body is made of an electrically non-conductive body material, and wherein
   the main nozzle body is provided with an electrically conductive first layer configured for induction heating of the main nozzle body and an electrically non-conductive second layer arranged around the main nozzle body, and wherein the electrically non-conductive body material comprises a first glass material, a first ceramic material, a first mineral material, or a combination thereof, and
   wherein the electrically conductive first layer and the electrically non-conductive second layer are arranged in non-overlapping side by side fashion in a longitudinal direction of the nozzle, wherein the nozzle further comprises a coil element arranged around the main nozzle body in order to heat the electrically conductive first layer during operation of the nozzle.

2. The nozzle according to claim 1, wherein the electrically non-conductive body material is at least in part optically transparent and/or at least in part RF transparent.

3. The nozzle according to claim 1, wherein the electrically conductive first layer comprises a metal or graphite material, or a combination thereof.

4. The nozzle according to claim 1, wherein the electrically non-conductive second layer comprises a second glass, a second ceramic, a second mineral material, or any combination thereof.

5. The nozzle according to claim 1, wherein a first sensor actuator element is arranged on an outer surface of the main nozzle body, on an inner surface of the central conduit, or within the electrically non-conductive body material of the main nozzle body.

6. The nozzle according to claim 5, wherein the first sensor actuator element is a light sensor and/or a light source and/or a thermal sensor.

7. The nozzle according to claim 1, wherein the nozzle further comprises a second sensor actuator element arranged between the main nozzle body and the electrically conductive first layer and/or the electrically non-conductive second layer.

8. The nozzle according to claim 7, wherein the second sensor actuator element is a thermal sensor.

9. The nozzle according to claim 1, wherein the nozzle further comprises a pathway extending through the main nozzle body between the central conduit and an outer surface of the main nozzle body.

10. The nozzle according to claim 9, wherein the pathway is a secondary conduit or an optical pathway.

11. The nozzle according to claim 1, wherein the electrically conductive first layer and electrically non-conductive second layer are arranged at the same radial distance from the central conduit.

* * * * *